United States Patent
Centonza et al.

(10) Patent No.: US 8,971,226 B2
(45) Date of Patent: Mar. 3, 2015

(54) METHOD AND APPARATUS FOR DYNAMIC AND ADJUSTABLE ENERGY SAVINGS IN A COMMUNICATION NETWORK

(75) Inventors: Angelo Centonza, Winchester (GB); Min Huang, Beijing (CN); Yang Tian, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 176 days.

(21) Appl. No.: 13/579,573

(22) PCT Filed: Jun. 11, 2012

(86) PCT No.: PCT/EP2012/061007
§ 371 (c)(1),
(2), (4) Date: Aug. 17, 2012

(87) PCT Pub. No.: WO2013/110353
PCT Pub. Date: Aug. 1, 2013

(65) Prior Publication Data
US 2013/0194989 A1    Aug. 1, 2013

(30) Foreign Application Priority Data

Jan. 27, 2012    (CN) .............................. 2012/070720

(51) Int. Cl.
*G08C 17/00*    (2006.01)

(52) U.S. Cl.
USPC .......................................... 370/311; 370/465

(58) Field of Classification Search
USPC ................. 370/311, 328–329, 331–333, 336, 370/342–343, 345, 347, 441–442, 465, 370/478–480; 455/436–440, 442–444
See application file for complete search history.

(56) References Cited

U.S. PATENT DOCUMENTS

| 7,502,614 B2 * | 3/2009 | Uchida et al. ................. 455/436 |
| 7,653,394 B2 * | 1/2010 | McMillin ...................... 455/444 |
| 8,446,844 B1 * | 5/2013 | Dinan ........................... 370/254 |
| 2004/0229621 A1 | 11/2004 | Misra |

(Continued)

FOREIGN PATENT DOCUMENTS

| WO | 2010077193 A1 | 7/2010 |
| WO | 2011031197 A1 | 3/2011 |

(Continued)

OTHER PUBLICATIONS

3rd Generation Partnership Project,Technical Specification Group Radio Access Network, Evolved Universal Terrestrial Radio Access Network (E-UTRAN), X2 application protocol (X2AP) (Release 10), 3GPP TS 36.423 V10.3.0, Sep. 2011.

*Primary Examiner* — Kevin Mew
(74) *Attorney, Agent, or Firm* — Murphy Bilak & Homiller, PLLC

(57) ABSTRACT

In one aspect, the present invention comprises an apparatus and method for improving energy saving procedures in a wireless communication network, wherein one or more cells in the network are selectively inactivated for energy savings and reactivated as needed. More particularly, the present invention provides improved control for transitioning a cell to or from a power savings mode, including dynamic, adjustable power control and handover parameter control, based on the involved cells exchanging status and/or control information. The dynamic control results in gradual rather than abrupt changes to cell coverage area, as a cell is transitioned to or from the power savings mode.

25 Claims, 8 Drawing Sheets

(56) References Cited

U.S. PATENT DOCUMENTS

| | | |
|---|---|---|
| 2008/0130580 A1* | 6/2008 | Chaponniere et al. ........ 370/331 |
| 2010/0238888 A1* | 9/2010 | Sampath et al. ............. 370/329 |
| 2010/0238901 A1* | 9/2010 | Sampath et al. ............. 370/331 |
| 2011/0044284 A1* | 2/2011 | Voltolina et al. ............. 370/331 |
| 2013/0028161 A1* | 1/2013 | Maeda et al. ................. 370/311 |
| 2013/0250908 A1* | 9/2013 | Bach et al. ................... 370/331 |
| 2013/0294356 A1* | 11/2013 | Bala et al. .................... 370/329 |
| 2013/0308578 A1* | 11/2013 | Dwyer et al. ................. 370/329 |
| 2014/0064247 A1* | 3/2014 | Teyeb et al. .................. 370/331 |

FOREIGN PATENT DOCUMENTS

| | | |
|---|---|---|
| WO | 2011149081 A1 | 12/2011 |
| WO | 2011149084 A1 | 12/2011 |
| WO | 2011151684 A1 | 12/2011 |
| WO | 2012005633 A1 | 1/2012 |

\* cited by examiner

LTE architecture showing logical interfaces between eNBs (X2) and between eNB and MME/S-GW (S1)

METHOD AND APPARATUS FOR DYNAMIC AND ADJUSTABLE ENERGY SAVINGS IN A COMMUNICATION NETWORK

TECHNICAL FIELD

The present invention generally relates to communication networks, and particularly relates to energy savings in such networks.

BACKGROUND

The architecture of a 3GPP Long Term Evolution, "LTE", system is shown in FIG. 1, including an illustration of the X2 interfaces between base stations, referred to as "eNode Bs" or "eNBs" in the LTE standard, and the S1 interfaces between the eNBs and a Mobility Management Entity, "MME", and Serving Gateway, "S-GW". LTE is thus based on a rather flat architecture compared to 2G and 3G systems.

Each cell in an LTE network is served by an eNB, and handovers of wireless communication devices between network cells can be handled either by the MME via the S1 interface, or directly between the involved eNBs via the X2 interface. For details regarding the X2 interface and its associated protocols, see the 3GPP Technical Specification, TS 36.423 Rel-10 V10.3.0, for the X2 application protocol, "X2AP", in Release 10. Note that the wireless communication devices supported by the illustrated network generally are associated with subscribers to the network, and may be referred to as user equipment, where "UE" denotes a singular item of such equipment and "UEs" denotes plural items.

In any given cellular network, there typically are areas with high traffic arising from high concentrations of users—here, "user" means the user and/or his or her associated UE, which is connected to the network and, at least intermittently, consumes network resources. Deploying additional capacity in areas of typically high user concentration is a desirable approach to ensuring higher user satisfaction in those areas.

The added capacity may derive from one or more additional "macro" base stations, which generally operate with significant power levels and offer radio service over a relatively large geographic area. Alternatively, the network operator may choose to supplement or augment the network by adding one or more lower-power base stations, e.g., "pico" base stations, which typically have a much smaller coverage area than the macro base stations, or "femto" base stations which may have an even smaller coverage area. Such deployments provide a concentrated "capacity boost" within the smaller coverage areas of the pico and femto base stations. Such capacity boosts may be used to provide higher data rates, for example.

Further, in the typical cellular network, there are areas of poor radio coverage. One approach to providing better coverage involves placing a pico or femto base station in the poor coverage area. These smaller base stations, more broadly referred to as low power nodes or "LPNs" may be, for example, Home NodeBs, "HNBs", Home eNodeBs, "HeNBs", Relay Nodes, "RNs", etc. In any case, one argument for deploying one or more LPNs within the network is that the impact on the macro network can be minimized. That is, the macro base stations may be regarded as providing a macro layer of coverage, and the LPNs may be regarded as providing a pico or micro layer of coverage that overlays or extends the macro layer coverage.

Broadly, networks having such mixed deployments are referred to as Heterogeneous Networks or "HetNets". FIG. 2 illustrates an example HetNet deployment scenario, where the coverage area of a macro cell includes one or more hotspots—areas of boosted capacity/coverage—provided via the deployment of LPNs. In the particular example provided in the diagram, there are a mix of LPN types, including pico cells, femto cells, and Relay Nodes, "RNs". Further, although the figure shows clusters of femto cells, it is obvious that single cell deployments may also exist.

Mechanisms to reduce power—energy saving techniques—implemented in HetNets and, indeed, in communication networks in general, are environmentally friendly and they can reduce the capital expenditures (CAPEX) required of network operators. Energy savings are thus garnering increasing attention in standardization and commercial deployments. In the current 3GPP TS 36.300, it is suggested to turn off only those cells used for boosting capacity, but not those cells providing the basic network coverage.

FIG. 3 illustrates an example case, where one sees a macro cell serving as a basic-coverage cell. One further sees a pico-cell overlaid within the macro cell coverage area and serving as a capacity-boost cell. According to TS 36.300, the capacity-boost cell could be turned off for energy savings. In particular, the procedure specified in relevant part by TS 36.300 is as follows:

1. A macro eNB and a pico eNB exchange their load information via an X2AP message RESOURCE STATUS UPDATE.

2. According to the load information from macro eNB and itself, the pico eNB decides to turn off its transmission power and enter into a dormant mode. To do so, the pico eNB initializes its connected UEs to undertake handovers (HOs) to the basic-coverage cell. The pico eNB indicates to the macro eNB that the HO cause is "energy saving."

3. The pico eNB turns off its capacity boost cell and indicates this event to the macro eNB via a Deactivation Indication Information Element, "IE", in the X2AP: ENB CONFIGURATION UPDATE message. The macro eNB records the change.

4. When the load of the macro eNB's basic-coverage cell overfills, the macro eNB can reactivate the capacity-boost cell, to bring it out of its energy-saving mode, based on sending an X2AP:CELL ACTIVATION message to the pico eNB.

To maintain service continuity for UEs being handed over from the capacity-boost cell to the basic-coverage cell, the handovers initiated by the pico eNB in preparation for entering energy-saving operation must be conducted smoothly and must be subject to a low failure rate.

One issue related to achieving service continuity during such handovers relates to how the capacity-boost cell power is turned off. In particular, the question becomes how the pico eNB turns off transmission power in the capacity-boost cell gradually, so as to achieve a gradual decrease in capacity-boost cell coverage and thereby give time for gradually handing over the UEs supported by the capacity-boost cell. Improper settings of the power adjustment speed and extent of energy saving risks an increase in the handover failure rate. Handover failures negatively affect the user experience.

Alternatively, the basic-coverage cell targeted by these handovers might be unable to accept more incoming handovers, meaning that the process of powering down the capacity-boosting cell should be ceased. The procedures currently set forth in 3GPP TS 36.300 do not adequately detail these issues and are insufficient for addressing them.

The approach to reactivating a dormant capacity-boost cell represents another shortcoming of the currently contemplated procedures. According to current procedures, the macro eNB in a basic-coverage cell sends an indication to the pico eNB of the dormant capacity-boost cell, indicating that the capacity-boost cell should be reactivated. Here, the term "pico" is used somewhat generically, to cover pico cells, femto cells, and other smaller cells served by an LPN.

In any case, the reactivation process poses the problem of conducting reactivation in a manner that is sufficient for allowing the macro eNB to begin offloading UEs to the capacity-boost cell, while at the same time conducting the reactivation in an energy-efficient manner. If the adjustment speed (regarding adjustments step and period) and extent of energy saving are not set properly, the increased power might be unnecessary.

SUMMARY

In one aspect, the present invention comprises an apparatus and method for improving energy saving procedures in a wireless communication network, wherein one or more cells in the network are selectively inactivated for energy savings and reactivated as needed. More particularly, the present invention provides improved control of cell transmission power and/or cell handover trigger parameters, for transitioning a cell to and from a power savings mode. With these improvements, gradual changes in cell coverage area are effected via corresponding dynamic control of cell transmission power and/or handover trigger parameters, e.g., based on the involved cells repeatedly exchanging status or control information.

In a non-limiting example, a 3GPP network includes a first cell controlled by a first eNB and a second cell controlled by a second eNB—e.g., the first cell comprises a macro-coverage cell controlled by a macro-coverage eNB and the second cell comprises an overlaid capacity-boost cell controlled by a pico eNB. The first cell may be referred to as the basic-coverage cell and the second cell may be referred to as the capacity-boost cell. In some embodiments, a method of controlling the cell coverage area of the capacity-boost cell includes determining that the capacity-boost cell should be transitioned to or from a power-savings mode, and initiating the transition by beginning a gradual change in cell coverage area of the capacity-boost cell. The gradual change is initiated by initiating a change in at least one of cell transmission power and cell handover trigger parameters for the capacity-boost cell and dynamically controlling the change in cell coverage area as a function of status or control information sent repeatedly from the basic-coverage cell, so that a rate or extent of the change in the cell coverage area depends on the status or control information.

In some embodiments, controlling the cell coverage area of the capacity-boost cell is based on determining whether to transition the capacity-boost cell to or from a power-savings mode based on a cell status of the capacity-boost cell and/or the basic-coverage cell. Here, the cell coverage area of the capacity-boost cell is reduced when transitioning to the power-savings mode and increased when transitioning from the power-savings mode, and the control method includes exchanging status or control information repeatedly between a first base station that controls the basic-coverage cell and a second base station that controls the capacity-boost cell, and dynamically controlling a rate or extent of change in the cell coverage area for the transition as a function of the repeatedly exchanged status or control information.

The exchange of information is based on, for example, the first and second eNB exchanging status information using an enhanced version of the X2AP RESOURCE STATUS UPDATE procedure defined in TS 36.423. Alternatively, the first and second eNB exchange control information prior to and during cell inactivation and activation using an enhanced version of the X2AP MOBILITY CHANGE REQUEST procedure defined in TS 36.423.

An example system configured for such control includes a first base station that is configured to control a basic-coverage cell in a wireless communication network, and a second base station that is configured to control a capacity-boost cell that boosts the capacity of the basic-coverage cell. Each base station includes a communication interface circuit for exchanging status and/or control information with the other base station, and further includes one or more processing circuits.

In the first base station, the one or more processing circuits are configured to monitor loading in one or both of the basic-coverage cell and the capacity-boost cell, initiate a transition in the capacity-boost cell to or from a power-savings mode, based on such monitoring, and to dynamically control a rate or extent of said transition by repeatedly sending control or status information that gradually changes cell transmission power or handover trigger parameters for the capacity-boost cell, thereby gradually changing a coverage area of the capacity-boost cell. In complementary fashion, in the second base station, the one or more processing circuits are configured to initiate the transition to or from the power-savings mode in response to the control or status information sent from the first base station, and further to dynamically control the rate or extent of changes in cell coverage area by dynamically controlling the rate or extent of changes in the cell transmission power or the handover trigger parameters according to the control and status information repeatedly sent by the first base station.

In an example of the first base station discussed above, the one or more processing circuits are configured to monitor loading in one or both of the basic-coverage cell and the capacity-boost cell, initiate a transition in the capacity-boost cell to or from a power-savings mode, based on such monitoring, and dynamically control a rate or extent of the transition by repeatedly sending control or status information to the second base station that gradually changes cell transmission power or handover trigger parameters for the capacity-boost cell. The gradual changes to cell transmission power and/or handover trigger parameters provides correspondingly gradual changes in the coverage area of the capacity-boost cell.

In an example of the second base station discussed above, the one or more processing circuits are configured to receive status or control information from the first base station indicating that the capacity-boost cell should be transitioned to or from a power-savings mode, and to dynamically control the transition of the capacity-boost cell to or from the power-savings mode so that a coverage area of the capacity-boost cell gradually changes during said transition. In some embodiments, the one or more processing circuits of the second base station are configured to dynamically change a transmission power of the capacity-boost cell or handover trigger parameters of the capacity-boost cell as a function of changed values received in a mobile change request message repeatedly transmitted to it from the first base station.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
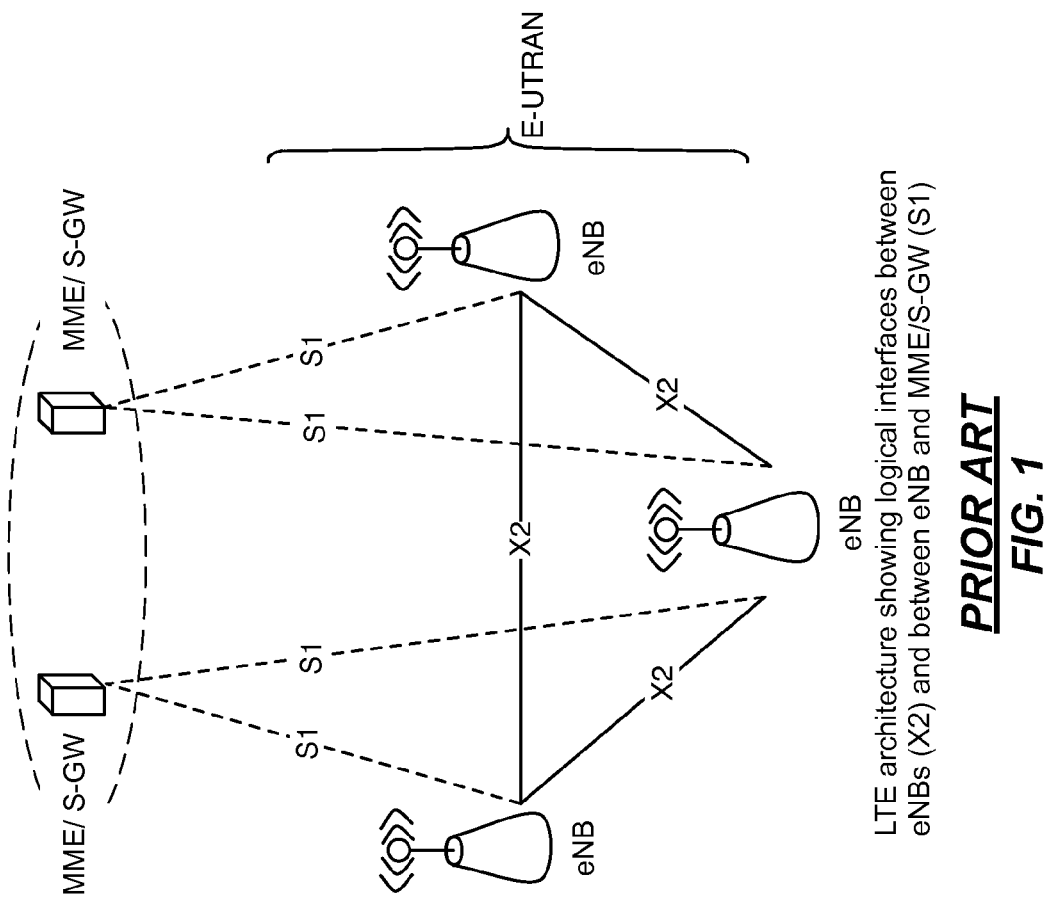
FIG. 1 is a block diagram of a conventional 3GPP network, illustrating X2 and S1 interfaces between various nodes in the network.
Figure 2:
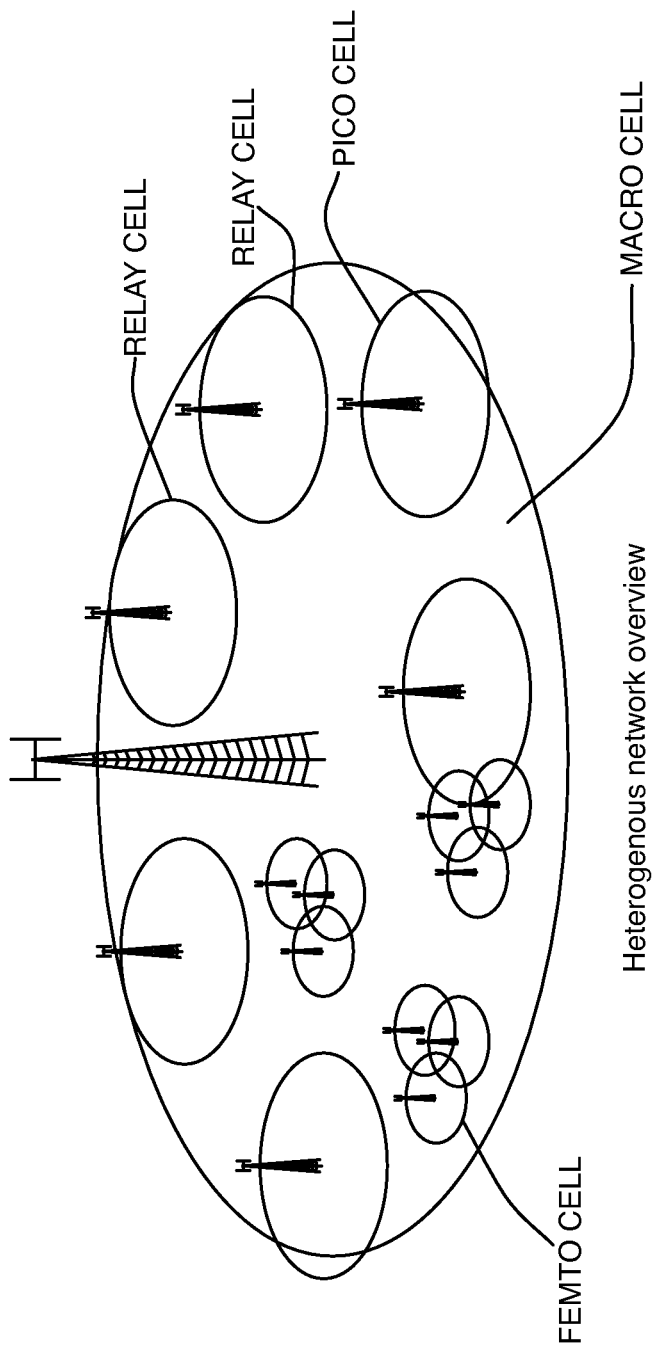
FIG. 2 is a diagram of a conventional heterogeneous network.
Figure 3:
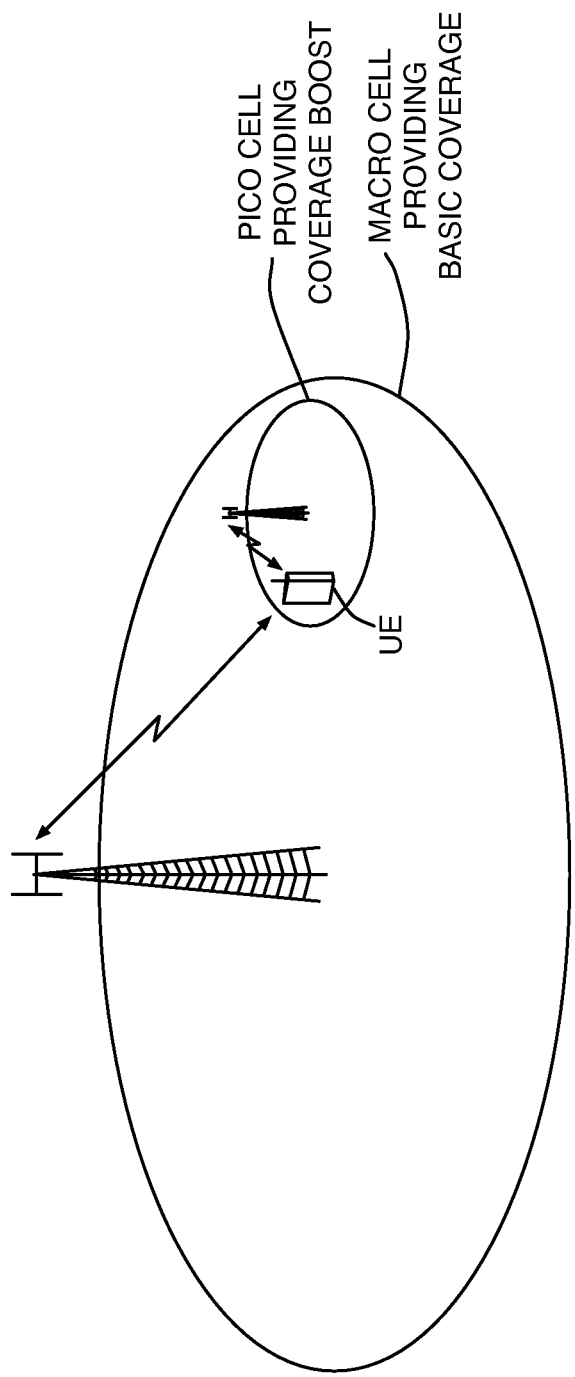
FIG. 3 is a diagram of a conventional "macro-coverage" cell and its associated "capacity-boost" cell.
Figure 4:
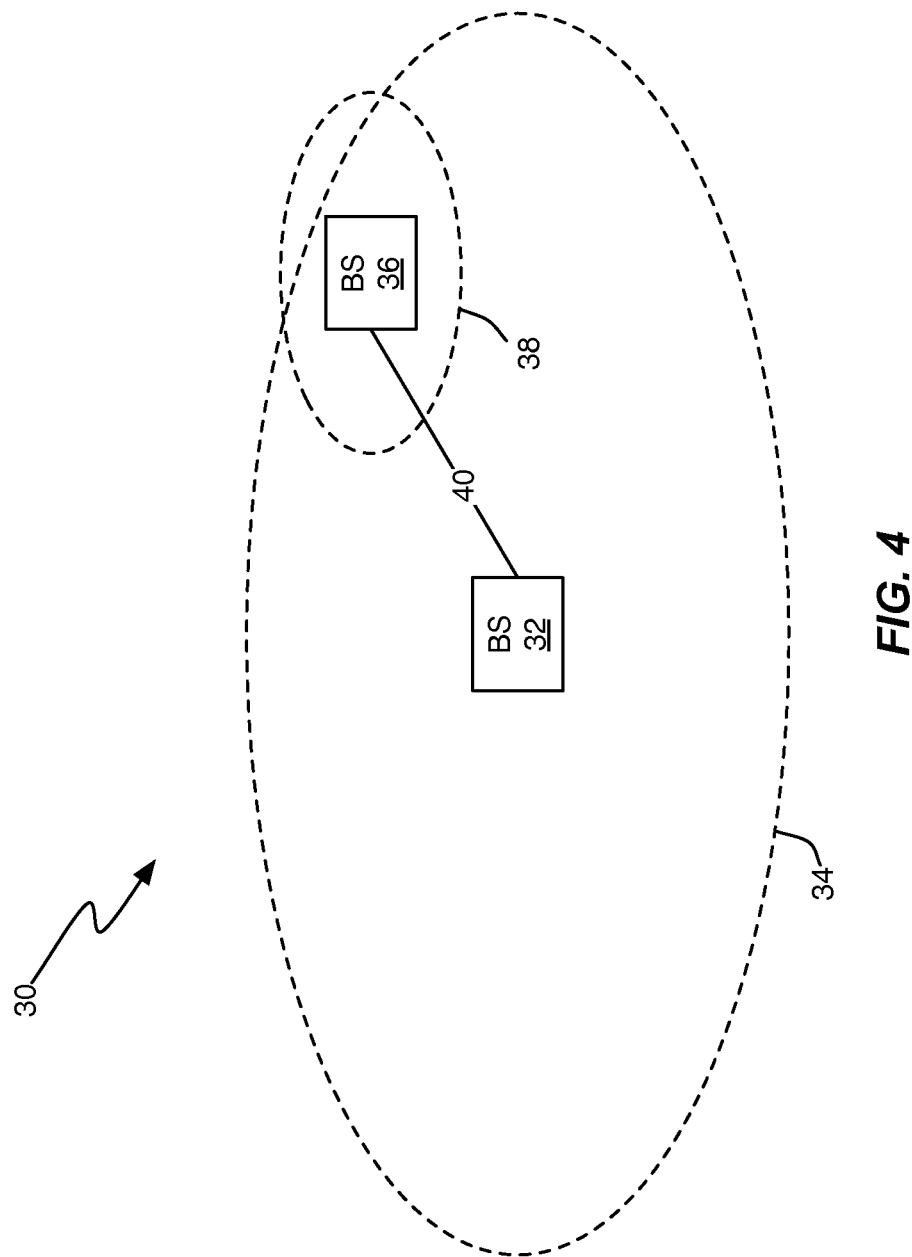
FIG. 4 is a block diagram of a wireless communication network according to an embodiment of the present invention, including first and second base stations controlling basic-coverage and capacity-boost cells, respectively.

In a first embodiment of the present invention, which is depicted in FIG. 4, a wireless communication network 30 includes a first base station 32 providing coverage in a first cell 34, and further includes a second base station 36 providing coverage in a second cell 38. The two base stations 32 and 36 are configured to exchange status and control information, which, according to the teachings herein, improves the transition to or from a power-savings mode by enabling gradual changes in the cell coverage area. Correspondingly, the two base stations 32 and 36 are configured to communicate with one another, e.g., via a communication interface 40 that communicatively links them together.

In a non-limiting example, the network 30 is a cellular communication network configured according to the 3GPP LTE standard. Of course, the network 30 is only partially depicted in the diagram and it may include many other nodes, such as additional Radio Access Network, "RAN", nodes, and a number of Core Network, "CN", nodes.

In a 3GPP embodiment, the base stations 32 and 36 are eNBs. Further, it will be understood that the base stations 32 and 36 are depicted in a simplified fashion to facilitate discussion. In actual implementation, the base stations 32 and 36 include one or more radio transceiver circuits and associated transmit/receive antennas, which allow each base station 32 or 36 to provide radio service in its corresponding cell 34 or 38. The cells 34 and 38 also may be sectorized, although such details are not shown. In an example embodiment, each cell 34 or 38 is defined as the allocation or provisioning of given radio resources to a given geographic area given communication resources providing radio service in a given area. In this regard, it will be understood that each base station 32 or 36 may provide multiple cells in a multi-carrier configuration of the network 30, for example.

However, of more particular interest in the context of this disclosure, the two depicted base stations 32 and 36 are related in the sense that they cooperate in an energy savings procedure, and in particular the two base stations 32 and 36 are configured to exchange status and control information to improve the energy savings procedure. In an example embodiment, the energy savings procedure involves the controlled inactivation and reactivation of one of the cells 34 or 38, for reducing power consumption in network 30. The selectively active cell may be referred to as the "energy-saving" cell and in an example embodiment the two cells 34 and 38 are related in that one provides basic coverage, also referred to as macro coverage, and one provides capacity-boost coverage over a smaller area that typically but not necessarily overlays the basic coverage area. The drawing reflects this example context by showing that in relative terms the cell 34 is much larger than the cell 38.

Consequently, in a non-limiting example sense, the first base station 32 may be regarded as a basic-coverage base station 32, the first cell 34 may be regarded as a basic-coverage cell 34, the second base station 36 may be regarded as a capacity-boost base station 36, and the second cell 38 may be regarded as a capacity-boost cell 38.

At least one embodiment of the present invention defines a procedure wherein the two base stations 32 and 36 exchange information that improves the control procedures used for changing the capacity-boost cell 38 to or from the power-savings mode. In an example, the coverage area of the capacity-boost cell 38 changes when it enters the power-savings mode (e.g., it decreases to zero or some minimum value). Conversely, the coverage area of the capacity-boost cell 38 generally is larger when it is not in the power-savings mode.

According to the base station configurations and control methods taught herein, the first and second base stations 32 and 36 cooperate to effect a gradual increase in cell coverage area of the capacity-boost cell 38 when the capacity-boost cell 38 transitions from the power-savings mode, and to effect a gradual decrease in the cell coverage area of the capacity-boost cell 38 when the capacity-boost cell 38 transitions to the power-savings mode. Such transitions are effected by exchanging status or control information that dynamically changes the cell transmission power or the cell handover trigger parameters used in the capacity-boost cell 38. Such information can be, at least for certain items of status and control information, one-time, periodic, event-triggered, or some combination thereof. In a non-limiting example, the "status information" comprises traffic load, handover, "HO", volume headroom, Physical Random Access Channel, "PRACH", resource headroom, etc.

Figure 5:
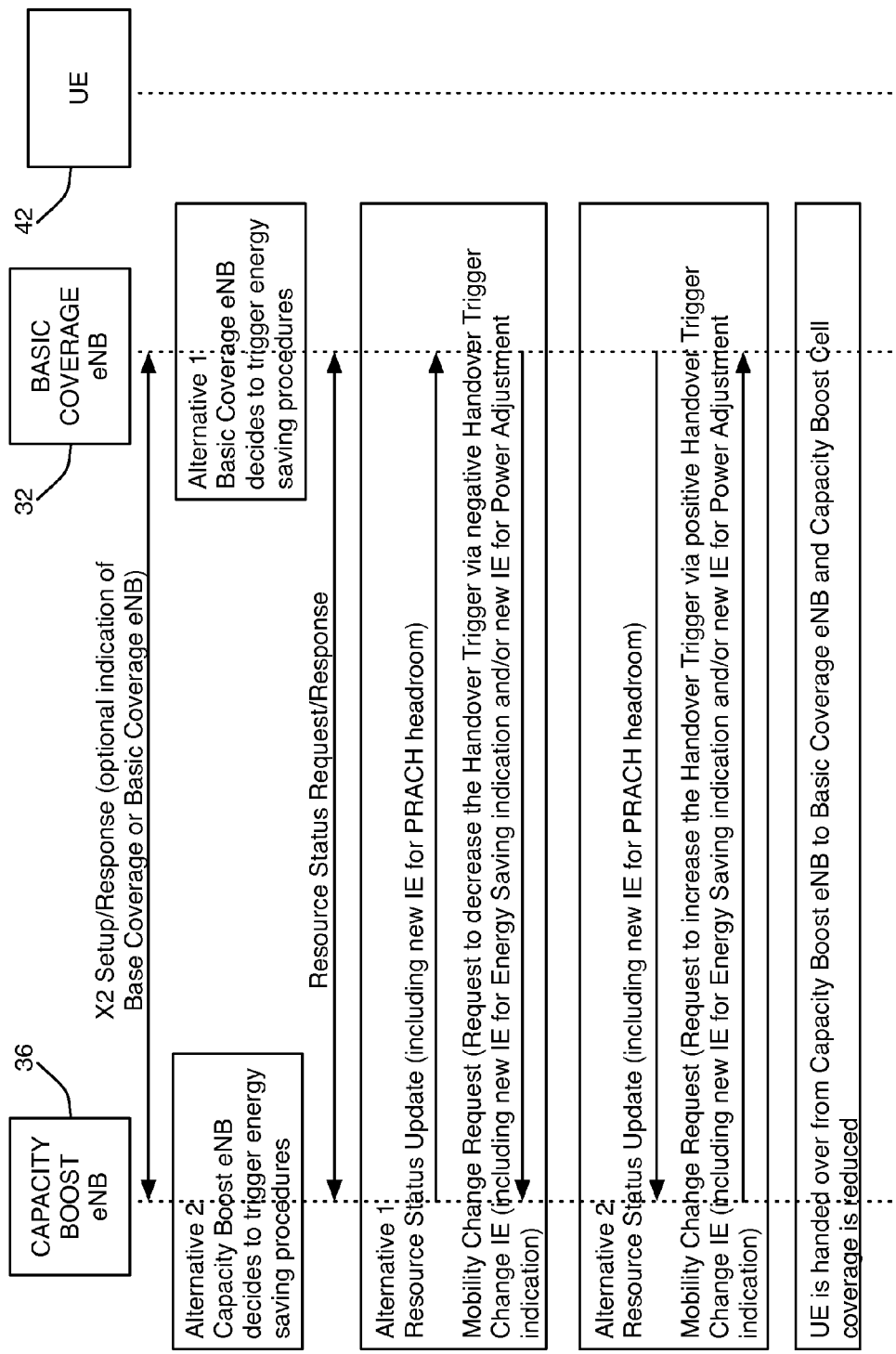
FIG. 5 is a signal flow diagram of one or more embodiments of exchanging status and control information between the base stations of two cells involved in energy savings procedures, to effect gradual transitions to or from a power-savings mode for a capacity-boost cell.

With these examples in mind, FIG. 5 depicts the exchange of such information in a 3GPP example, wherein the base stations 32 and 36 are identified as eNBs. The exchange is conducted using the X2: RESOURCE STATUS UPDATE procedure, which is enhanced with a new Information Element, "IE", indicating the PRACH Headroom. Note that FIG. 5 also depicts one or more UEs 42 that will be involved in cell HO because of the energy savings procedure.

The exchanged "control information" in one or more embodiments includes a value that indicates the handover trigger change and/or the transmission power change. In an example case, such an approach to exchanging control or status information allows the first base station 32 to repeatedly send a handover trigger parameter value (e.g., an individual offset value that UEs add to or subtract from measured cell signal quality) or a cell transmission power value to the second base station 36. It will be understood that changing the handover trigger parameter value and/or changing the cell transmission power value effectively changes the cell coverage area of the capacity-boost cell 38, either by changing the actual cell boundaries or by changing the apparent signal quality of the capacity-boost cell 38, as seen by UEs operating in or around the capacity-boost cell 38. In either case, the cell coverage area of the capacity-boost cell 38 is changed gradually, based on gradually changing the cell transmission power value or the handover trigger parameter value used by the second base station 36 for the capacity-boost cell 38. Such gradual changes avoid abrupt control changes that could be disruptive to service in or around the capacity-boost cell 38.

In a particular example, control information is exchanged via the X2: MOBILITY CHANGE REQUEST message. That message provides an indication of how the handover trigger point needs to be modified as well as a new IE that flags whether the handover trigger change request is for normal load balancing procedures or for energy saving. The transmission power change can be either calculated from the handover trigger change, or transferred by the X2 message with one more IEs (for example, a named Power Adaptation Index expressed in dB or dBm) or by a different interpretation of the current Handover Trigger Change IE—for example, where the IE is interpreted as the reduction/increase of current transmission power. Such allows the first base station 32 to signal the second base station 36 to initiate a transition to or from the power-savings mode, for the capacity-boost cell 38. Further, such signaling allows the first base station 32 to dynamically control the rate or extent of such transition, by sending changing value(s) for the cell transmission power or handover trigger parameters in repeated transmissions of the X2: MOBILITY CHANGE REQUEST message, as sent to the second base station 36.

FIG. 5 illustrates that, prior to starting the energy saving procedures, one of the eNBs controlling the basic-coverage cell or the capacity-boost cell triggers the X2: RESOURCE STATUS UPDATE procedures, in order to verify the load at each corresponding cell. Two alternatives are contemplated herein: Alternative 1, wherein the basic-coverage eNB 32 decides to trigger the energy saving procedure; or Alternative 2, wherein the capacity-boost eNB 36 decides to trigger the energy saving procedure. As is shown for the two alternatives, the transfer directions of X2 messages are opposite in these two alternatives.

According to current standard specifications, the X2: MOBILITY CHANGE REQUEST message is used for the purpose of load balancing between neighbor cells. However, according to the present invention, the message advantageously used to change the cell border between capacity-boost cell 38 and the basic-coverage cell 34 in a manner that allows the capacity-boost eNB 36 to reduce its transmission power and therefore the coverage area of the capacity-boost cell 38. Hence, for every request from the basic-coverage eNB 32 to decrease the Handover Trigger via a negative Handover Trigger Change IE, or for every request from the capacity-boost eNB 36 to increase the Handover Trigger via a positive Handover Trigger Change IE, there will be a decrease of the transmission power at the capacity-boost cell 38, with consequent energy savings.

It should be noted that a new "Energy Saving Indicator" IE may be added into the signaling messages shown in FIG. 5. The capacity-boost eNB 36 calculates the change of transmission power to fit the change in handover trigger point. Alternatively, a new IE can be added to the X2: MOBILITY CHANGE REQUEST message, which indicates explicitly the level of power reduction calculated by the basic-coverage eNB 32.

It should also be noted that the X2: RESOURCE STATUS UPDATE procedures will continue even after the transmission/reception of the X2: MOBILITY CHANGE REQUEST message. Hence, if the X2: RESOURCE STATUS UPDATE indicates that, for example, the capacity-boost cell 38 is subject to an increasing load, or that the basic-coverage cell 34 is experiencing high load and needs to off-load some of its traffic to the capacity-boost cell 38. In at least one embodiment, such an indication stops the energy saving process.

Further, cases of increasing load in the capacity-boost cell 38 or in basic-coverage cell 34 are recognized herein as an opportune time for reversing the energy-savings procedure, by increasing the transmission power in the capacity-boost cell 38 and moving the handover trigger point away from the capacity-boost cell 38. Examples of how these alternatives can operate follow.

In the first alternative, load information is transferred repeatedly from the capacity-boost eNB 36 to the basic-coverage eNB 32. When the load information indicates that the load in the capacity-boost cell 38 is quite low, e.g. at five percent, the basic-coverage eNB 32 checks its own status in one or more aspects—e.g., load, PRACH resource headroom, traffic prediction, etc.—and then decides on the activation of gradual energy saving for the capacity-boost cell 38. Such status information transfers may be maintained in an ongoing fashion so that the energy-savings procedure can be closely monitored and corresponding control action taken as needed.

In a second alternative, control information is transferred from the basic-coverage eNB 32 to the capacity-boost eNB 36. For example, after taking the decision to initiate energy-savings procedures, the basic-coverage eNB 32 sends an X2: MOBILITY CHANGE REQUEST message to the capacity-boost eNB 36. In this message, a HO trigger change or transmission power change is included, as well as the indication to activate energy savings. This control information can be sent repeatedly to enable dynamic and gradual adjustment of the capacity-boost cell coverage area by dynamically controlling the cell transmission power and/or the capacity-boost cell handover trigger parameters, to reflect the dynamically changing statuses of the two cells in all respects.

In yet another alternative, load information is transferred repeatedly from the basic-coverage eNB 32 to the capacity-boost eNB 36. The load percentage in the basic-coverage cell 34 is initially fifty percent as an example, and this load information is sent from the basic-coverage eNB 32 to the capacity-boost eNB 36 every ten minutes, for example. The information is sent using, e.g., an X2: RESOURCE STATUS UPDATE. Correspondingly, the capacity-boost eNB 36 implements a policy whereby it reduces the cell transmission power of the capacity-boost cell 38 by 3 dB every ten minutes. Of course, other time intervals, including variable intervals, may be used for sending the information and making the corresponding, staged, gradual cell transmission power reductions.

According to the above approach, the capacity-boost eNB 36 might, after beginning its reduction of cell transmission power, receive load information from the basic-coverage eNB 32 that indicates an increasing load in the basic-coverage cell 34. Advantageously, in at least one embodiment, the capacity-boost eNB 36 is configured to monitor the load level as indicated by the load information that is sent repeatedly from the basic-coverage eNB 32, and to cease its reductions in cell transmission power in the capacity-boost cell 38 responsive to detecting that the load in the basic-coverage cell 34 reaches some defined threshold, e.g., eighty-percent.

The cessation in cell transmission power may be maintained, e.g., until the capacity-boost eNB 36 receives one or more load updates from the basic-coverage eNB 32 that indicate that the load in the basic-coverage cell 34 has fallen below a defined level, or is trending downward at some rate or by some amount. The triggering thresholds for ceasing and resuming cell transmission power reductions in the capacity-boost cell 38 may be separated by some amount that provides for hysteresis, or that otherwise stabilizes the overall "control loop".

In a further extension of such operation, the capacity-boost eNB 36 may be configured to reverse its energy-savings operations and begin increasing cell transmission power in the capacity-boost cell 38, in response to detecting that the load in the basic-coverage cell 34 continues increasing beyond the threshold that triggered its cessation in transmit power reduction. For example, upon seeing the load in the basic-coverage cell 34 hit the ninety-percent mark, the capacity-boost eNB 36 will begin incrementally bumping the cell transmission power of the capacity-boost cell 38 upwards until detecting a declining load in the basic-coverage cell 34, or until hitting some predefined or absolute transmit power limit. In a slight variation, the capacity-boost eNB 36 ceases cell transmission power increases responsive to detecting load stabilization in the basic-coverage cell 34.

In yet another alternative, control information is transferred from the capacity-boost eNB 36 to the basic-coverage eNB 32. For example, the capacity-boost eNB 36 sends a MOBILITY CHANGE REQUEST as well as the energy saving indicator to the basic-coverage eNB 32. The capacity-boost eNB 36 has all of the information needed to properly formulate such a message, based on its knowledge of its own cell loading, and based on the information received from the basic-coverage eNB 32 in an X2:RESOURCE STATUS UPDATE message received from the basic-coverage eNB 32.

In response to receiving the MOBILITY CHANGE REQUEST message and the energy saving indicator from the capacity-boost eNB 36, the basic-coverage eNB 32 infers or deduces that traffic should be offloaded from the capacity-boost cell 38 to the basic-coverage cell 34. In response to this offload request, the basic-coverage eNB 32 calculates its status in one or more relevant aspects—e.g., load, PRACH headroom, HO headroom, software and hardware processing capability, service predictions, etc. If the MOBILITY CHANGE REQUEST from capacity-boost eNB 36 can be accepted given the current status at the basic-coverage eNB 32, the basic-coverage eNB 32 shall send back an X2: MOBILITY CHANGE ACKNOWLEDGEMENT message. If the change cannot be accepted—for example, because the basic-coverage cell traffic is increasing—the basic-coverage eNB 32 returns an X2: MOBILITY CHANGE FAILURE message.

The above examples focus on LTE where certain existing X2AP messages can be reused and enhanced, allowing for implementation of the present invention with greatly reduced standardization and implementation efforts. However, the present invention has direct applicability to other network types and other Radio Access Technologies, "RATs", and in Inter-RAT deployments. Such deployments may require, however, the adoption of similar interfaces or at least an agreed-upon set of protocol messages enabling the exchange of the requisite status and control information needed for dynamic adjustment of cell transmission power in the context of energy-savings procedures.

In that regard, one advantage of the present invention is that it provides a dynamic and adaptable mechanism for improving energy-savings procedures in a wireless communication network in a manner that enhances the overall reliability of the network while optimizing in some sense the increases and decreases in cell transmission power. One or more of the embodiments described herein allow control of the energy-savings procedures either at the basic-coverage cell 34 or at the capacity-boost cell 38. The latter approach ensures that the appropriate hierarchy can be selected depending on the role of the associated base stations under analysis.

In a particular aspect of its advantageous operation, the proposed methods and apparatuses for improved energy-savings procedures in a wireless communication network, the present invention protects UEs from sudden drops in radio performance that would otherwise arise from potentially abrupt powering off of capacity-boosting cells. Instead, the present invention controls cell transmission power down (and power up) by making cell transmission power control dependent on the cooperative exchange of status or control information between the involved base stations, and thereby prevents handover failures for UEs camping on cells that are subject to being powered down for energy savings and, in general, optimizes radio performance while still ensuring minimum energy expenditures.

Figure 6:
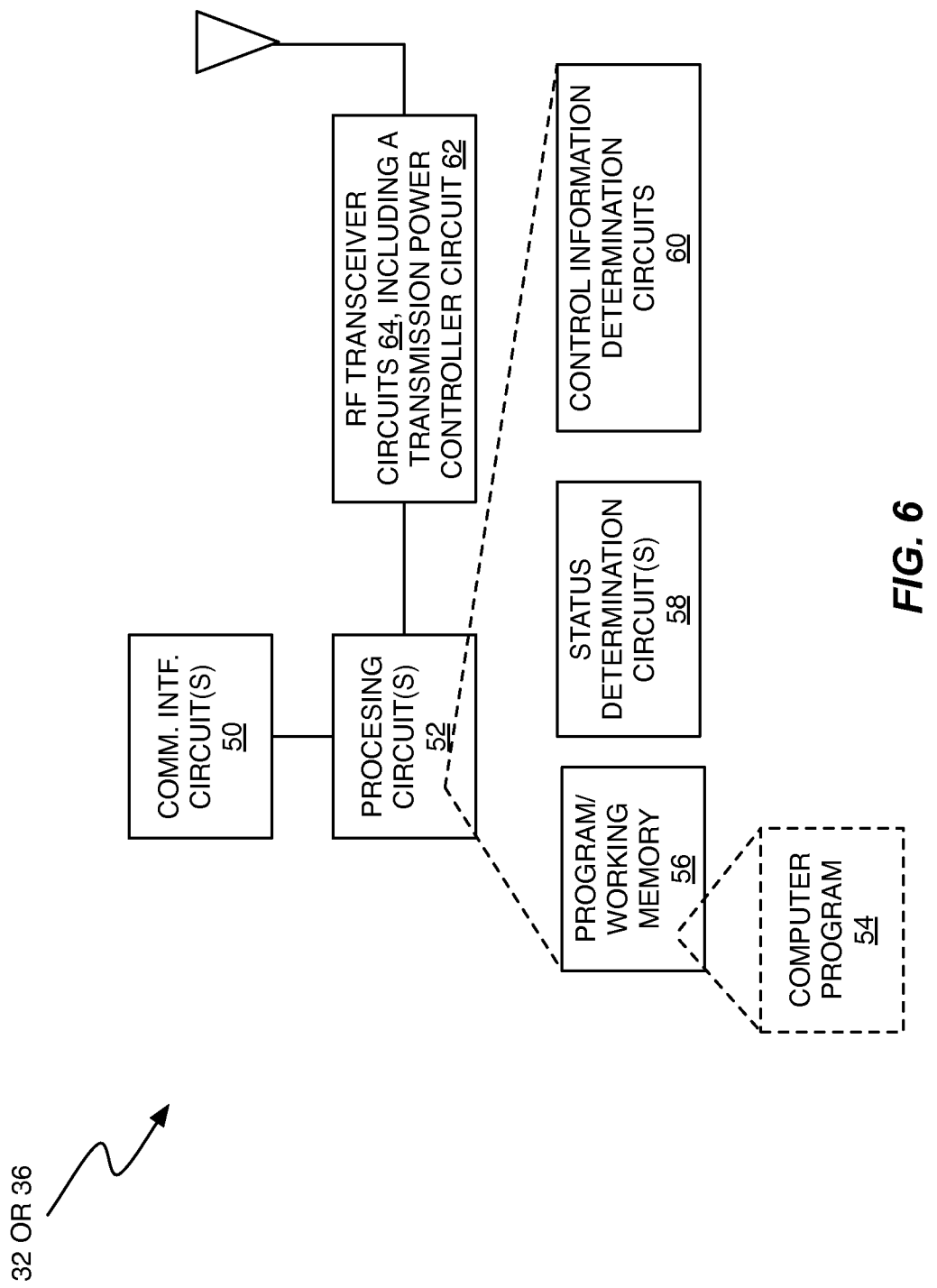
FIG. 6 is a block diagram of an example base station configuration, which may be used for one or both of a first base station, for controlling a basic-coverage cell, or a second base station, for controlling a capacity-boost cell.

With the above example features and advantages in mind, FIG. 6 illustrates an example functional architecture for the base station 32 or 36. While the same example diagram is used for both base stations 32 and 36, it should be understood that at least the functional circuit configuration (e.g., programming and operations) will differ in certain respects, in dependence on whether the base station is functioning as the basic-coverage cell base station or as the capacity-boost cell base station.

The illustrated base station 32 or 36 includes one or more communication interface circuits 50, e.g., an X2 communication interface circuit for an LTE embodiment wherein the base stations 32 and 36 are eNBs. The depicted base station 32 or 36 further includes one or more processing circuits 52, which are configured to carry out some or all of the processing disclosed herein for advantageous control of cell coverage area in the context of power-savings procedures. In at least one embodiment, the one or more processing circuits 52 comprise one or more microprocessor-based circuits, or other digital processing circuitry, that is configured at least in part based on the execution of computer program instructions 54 stored in a computer-readable medium, such as in the depicted working/program memory 56. The memory 56 may comprise essentially any type of computer-readable medium, and may comprise different types of storage, and includes non-volatile memory for storing the computer program instructions 54.

The processing circuit(s) 52 further include, for example, status and control information determining circuits 58 and 60. In an example configuration, these circuits are configured to determine the various status parameters described herein as useful for initiating and controlling power-savings procedures, such as cell load, PRACH overhead, HO overhead, etc. Such circuits, or the processing circuit(s) in general will consider a combination of status and/or control information, i.e., status or control information pertaining to the base station's own cell and to the cell of the other base station.

In any case, according to the teachings herein, at least for the case where the depicted base station is the base station 36, which is associated with the capacity-boost cell 38, the processing circuit(s) 52 cooperates with a transmission power control circuit 62 in or associated with one or more Radiofrequency, "RF", transceiver circuits 64, to dynamically control the rate or extent of change of cell coverage area when transitioning to or from the power-savings mode of the capacity-boost cell 38.

That is, the cell coverage area of the capacity-boost cell 38 can be gradually changed for transitioning to or from the power-savings mode by gradually changing the cell transmission power of the capacity-boost cell 38. Additionally, or alternatively, it can be changed by changing the handover trigger parameter for the capacity-boost cell 38. For example, the second base station 36 gradually changes the cell individual offset value of the capacity-boost cell 38, which changes the effective pilot coverage of the capacity-boost cell 38, by making the pilot signal appear better or worse than it actually is, to UEs operating in or around the capacity-boost cell 38. For example, making gradual positive changes to the cell individual offset boosts the measured quality of the capacity-boost cell pilot signal making it look gradually larger. Making gradual negative changes to the cell individual offset conversely makes the capacity-boost cell 38 gradually look smaller.

Figure 7:
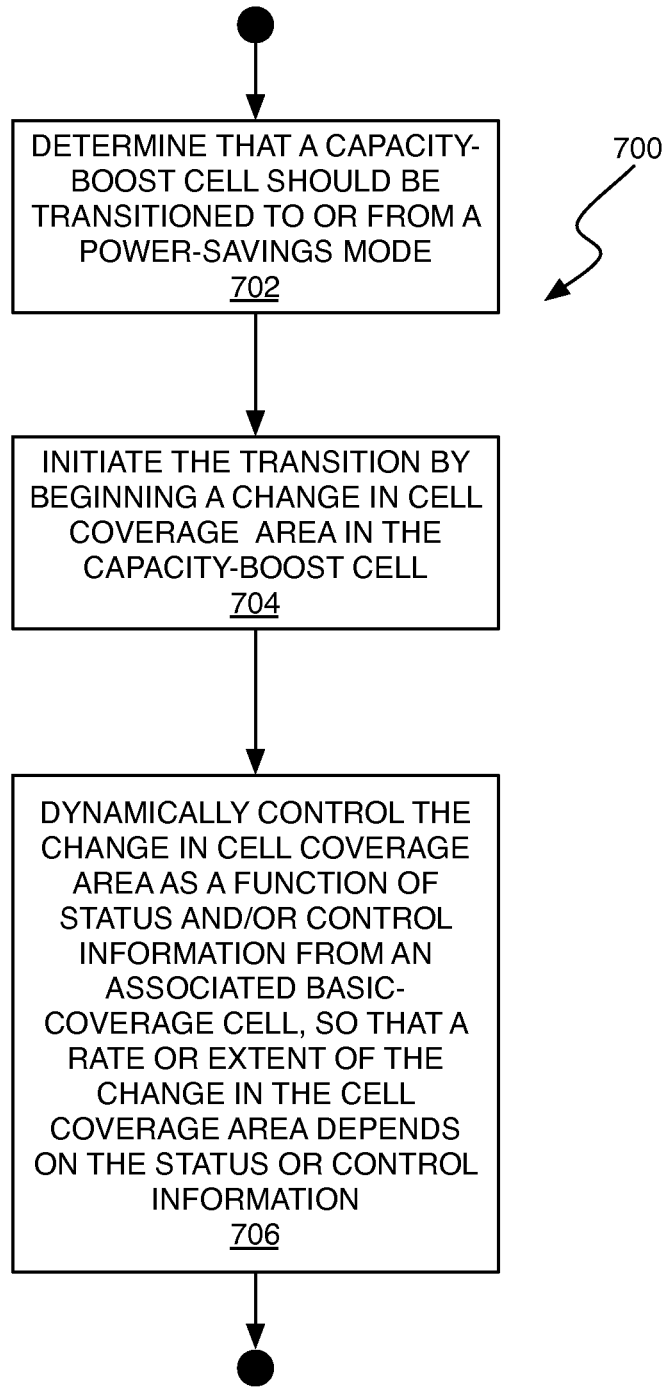
FIG. 7 is a logic flow diagram of one embodiment of a method of transitioning a capacity-boost cell to or from a power-savings mode, where a first base station controls a basic-coverage cell and a second base station controls an associated capacity-boost cell.

With these control options in mind, FIG. 7 illustrates an embodiment of a method 700 of controlling cell transmission power in a second cell 38 that operates as a capacity-boost cell for a first cell 34 that operates as a basic-coverage cell. The method 700 as illustrated includes: determining that the capacity-boost cell 38 should be transitioned to or from a power-savings mode (Block 702); initiating the transition by beginning a change in cell coverage area in the capacity-boost cell 38 (Block 704); and dynamically controlling the change in cell coverage area as a function of status or control information from the basic-coverage cell 34 (Block 706), so that a rate or extent of the change in the cell coverage area depends on the status or control information.

The method 700 can be understood as representing processing at the first base station 32. In an example of this perspective, the first base station 32 performs Step 702 based on cell status information available to it for the basic-coverage cell 34 and/or based on cell status information sent to it for the capacity-boost cell 38 from the second base station 36. Step 704 therefore represents, for example, a first control or status message sent from the first base station 32 to the second base station 36, to change the cell transmission power or the handover trigger parameters of the capacity-boost cell 38, to begin effecting the transition. Correspondingly, Step 706 represents the first base station 32 sending repeated control or status messages, to continue further, gradual changes in the cell transmission power or handover trigger parameters.

The method 700 can also be understood as the second base station 36 performing Step 702 (the determining) based on receiving and recognizing an indication from the first base station 32 that it should transition the capacity-boost cell 38 to or from the power-savings mode—e.g., the second base station 36 receives a message from the first base station 32 containing the previously-described power savings indicator. Further in the context of processing at the second base station 36, Step 704 can be understood as the second base station 36 initially changing the cell transmission power or the cell handover trigger parameters, to initiate the transitions. Correspondingly, Step 706 can be understood as the second base station 36 making further, incremental changes to the cell transmission power or handover trigger parameters, to carry out the transition on a gradual basis. Such gradual changes follow, e.g., gradually updated values for the cell transmission power or handover trigger parameters, as received in messages repeatedly sent to the second base station 36 from the first base station 32, or they represent the second base station 36 following statically or dynamically determined rate of change for the cell transmission power or handover trigger parameters.

Figure 8:
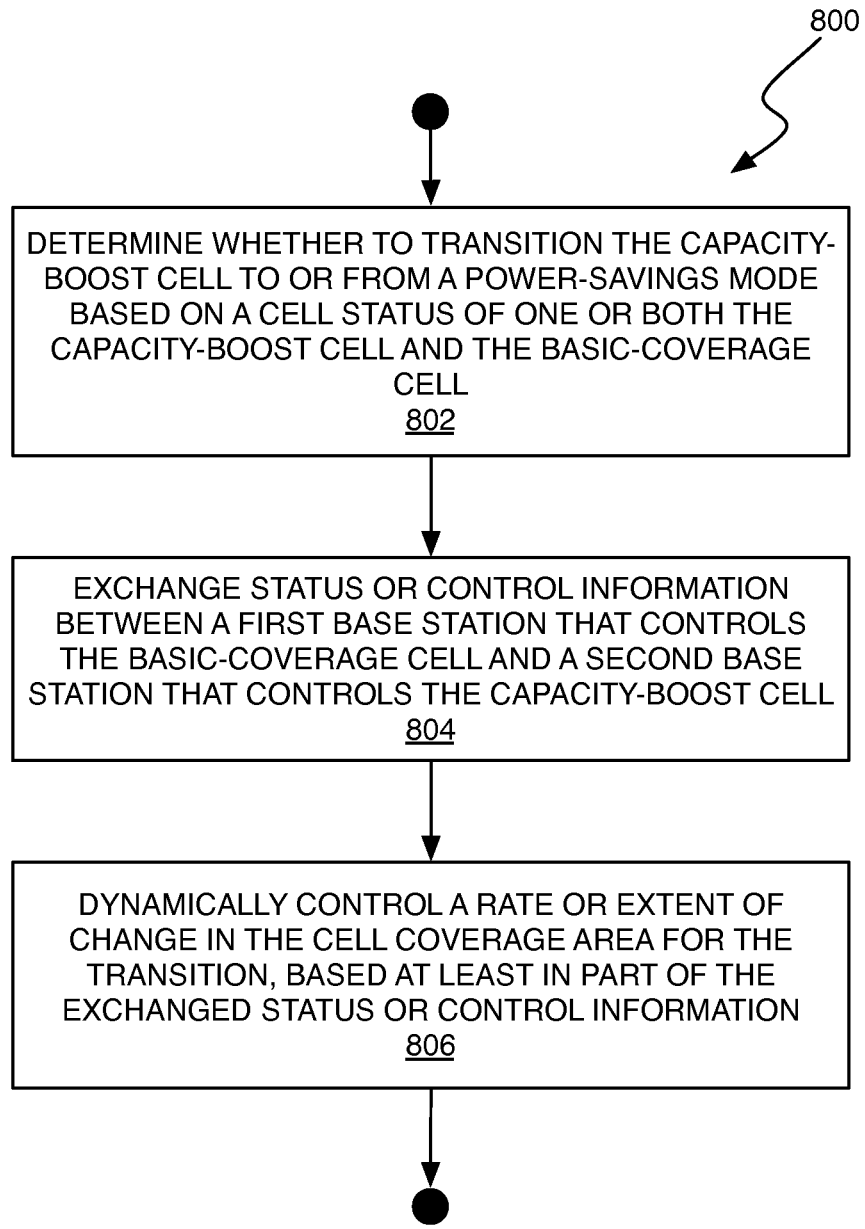
FIG. 8 is a logic flow diagram of further method details for transitioning a capacity-boost cell to or from the power-savings mode.

Similarly, FIG. 8 illustrates a method 800 that is implemented in the first base station 32, the second base station 36, or in some combination of the two base stations operating as a system. In any case, the method 800 includes determining whether to transition the capacity-boost cell 38 to or from the power-savings mode, based on the cell status of the basic-coverage cell 34, the capacity-boost cell 38, or both (Block 802). Here, "status" is, for example, the loading status of the basic-coverage cell 34, the loading status of the capacity-boost cell 38, or the loading status of both cells 34 and 38.

The method 800 further includes exchanging status or control information between the first and second base stations 32 and 36 (Block 804). From the perspective of the first base station 32, this step can be understood as sending an indication to begin such transition and/or sending changed control parameters to initiate such transition. Conversely, from the perspective of the second base station 36, Step 804 can be understood as receiving status or control information that initiates the transitions. Likewise, from the perspective of the first base station 32, Step 806 can be understood as sending repeated control or status messages, where the repeated messages include a gradually changing control value that correspondingly causes the second base station 36 to effect a gradual change in cell coverage area of the capacity-boost cell 38. Seen from the second base station 36, Step 806 can be understood as repeatedly receiving a control or status message that includes the gradually changing control value and correspondingly controlling the change in cell coverage area of the capacity-boost cell according to the gradually changing control value received from the first base station 32.

Thus, in at least one embodiment, the second base station 36 controls the capacity-boost cell 38 and receives the status or control information from a first base station 32 that controls the basic-coverage cell 34, and the status or control information comprises a repeatedly transmitted mobility change request message that includes a handover trigger change value or a transmission power change value—e.g., the message is sent periodically or on an ad hoc basis. Here, the second base station 36 adjusts the rate or extent at which it changes the cell transmission power as a function of the repeatedly received handover trigger or transmission power change values.

In one embodiment, when transitioning to the power-savings mode, the second base station 36 sends cell-loading information repeatedly to the first base station 32 and the second base station 36 determines that the capacity-boost cell 38 should be transitioned to the power-savings mode in response to receiving an indication to do so from the first base station. Here, the second base station 36 dynamically controls the change in cell transmission power by controlling the rate or extent at which the cell transmission power is reduced dynamically, in response to the cell loading information repeatedly sent from the first base station.

In one embodiment, the method includes ceasing reductions in the cell transmission power in response to detecting, via repeated cell loading information from the first base station 32, that the load in the basic-coverage cell 34 meets or exceeds a defined first loading threshold.

Further, in at least one such embodiment, the method includes reversing the reduction in the cell transmission power by making a dynamically controlled increase in the cell transmission power in response to detecting that the load in the basic-coverage cell 34 has continued rising or has met or exceeded a defined second threshold that is higher than the defined first threshold.

Still further, in at least one embodiment, the second base station 36 receives load information repeatedly from the first base station 32 and dynamically controls the rate or extent at which its changes the cell transmission power in the capacity-boost cell 38 as a function of the repeatedly received cell load information.

Thus, in one broad aspect, the present invention comprises a method of controlling cell transmission power in a second cell 38 that operates as a capacity-boost cell for a first cell 34 that operates as a basic-coverage cell. In an example embodiment, the method includes: determining whether to transition the capacity-boost cell 38 to or from a power-savings mode based on a cell status of one or both said capacity-boost cell 38 and said basic-coverage cell 34, wherein a cell coverage area of the capacity-boost cell 38 is reduced when transitioning to the power-savings mode and increased when transitioning from the power-savings mode; exchanging status or control information between a first base station 32 that controls the basic-coverage cell 34 and a second base station 36 that controls the capacity-boost cell 38; and dynamically controlling a rate or extent of change in the cell coverage area for said transition, based at least in part on the exchanged status or control information. In an example of such a control arrangement, the first and second base stations 32 and 36 are first and second eNBs, respectively, in an LTE communications network.

Still further, in at least one embodiment, in the case that the capacity-boost cell 38 is not in the power-savings mode and the second eNB sends a loading indication to the first eNB that indicates that the capacity-boost cell 38 is lightly loaded, determining whether to transition the capacity-boost cell 38 to or from the power-savings mode comprises the eNB deciding to transition the capacity-boost cell 38 to the power-savings mode and sending an indication of that determination to the second eNB, and wherein dynamically controlling the rate or extent of change in the cell coverage area for that transition comprises the second eNB beginning a gradual reduction in the cell coverage area in response to the indication that the power-savings mode should be entered.

Further, in one embodiment, the first eNB repeatedly sends a MOBILITY CHANGE REQUEST message to the second eNB via X2 signaling, each such message including an indicated change for a handover trigger value or a cell transmission power value, and wherein dynamically controlling the rate or extent of change in the cell coverage for the transition comprises the second eNB dynamically controlling the rate or extent of change in cell transmission power responsive to the repeatedly received indicated changes in the handover trigger or the cell transmission power value.

Still further, in one embodiment, the first eNB repeatedly sends a RESOURCE STATUS UPDATE message to the second eNB via X2 signaling, where that message indicates a load of the basic-coverage cell 34, and wherein dynamically controlling the rate or extent of change in the cell coverage for the transition comprises the second eNB dynamically controlling the rate or extent of change in cell transmission power or cell handover trigger parameters for the capacity-boost cell 38 responsive to the repeatedly received indicated load of the basic-coverage cell 34.

Still further, in one embodiment, the second eNB repeatedly sends a MOBILITY CHANGE REQUEST message to the first eNB via X2 signaling, where that message includes an energy savings indicator indicating a desire by the second eNB to transition into the power-savings mode, and wherein the first eNB decides whether to accept or deny the MOBILITY CHANGE REQUEST based on evaluating one or more status conditions of the basic-coverage cell, and sending back a return message that is either a MOBILITY CHANGE REQUEST ACKNOWLEDGMENT message or a MOBILITY CHANGE FAILURE message, in dependence on its evaluation. Here, the method further includes the second eNB determining whether or not to transition to the power-savings mode in dependence on the return message from the first eNB.

Of course, the above examples are non-limiting arrangements. More broadly, in one aspect the teachings herein disclose a system comprising: a first base station 32 that is configured to control a basic-coverage cell 34 in a wireless communication network 30; a second base station 36 that is configured to control a capacity-boost cell 38 that boosts the capacity of the basic-coverage cell 34; and wherein each base station 32, 36 includes a communication interface circuit 50 for exchanging status and/or control information with the other base station 32, 36, and further includes one or more processing circuits 52.

In the first base station 32, the one or more processing circuits 52 are configured to monitor loading in one or both of the basic-coverage cell 34 and the capacity-boost cell 38, initiate a transition in the capacity-boost cell 38 to or from a power-savings mode, based on said monitoring, and to dynamically control a rate or extent of said transition by repeatedly sending control or status information that gradually changes cell transmission power or handover trigger parameters for the capacity-boost cell 38, thereby gradually changing a coverage area of the capacity-boost cell 38.

In the second base station 36, the one or more processing circuits 52 are configured to initiate said transition to or from the power-savings mode in response to the control or status information repeatedly sent from first base station 32, and further to dynamically control the rate or extent of changes in cell coverage area by dynamically controlling the rate or extent of changes in the cell transmission power or the handover trigger parameters according to the control and status information repeatedly sent by the first base station 34.

Thus, according to some embodiments, a first base station 32 is configured for controlling a basic-coverage cell 34 that is associated with a capacity-boost cell 38 that is controlled by a second base station 36. This first base station 32 comprises: a communication interface circuit 50 for exchanging control or status information with the second base station 36; and one or more processing circuits 52. For the first base station 32, the one or more processing circuits 52 are configured to: monitor loading in one or both of the basic-coverage cell 34 and the capacity-boost cell 38; initiate a transition in the capacity-boost cell 38 to or from a power-savings mode, based on said monitoring; and dynamically control a rate or extent of said transition by repeatedly sending control or status information to the second base station 36 that gradually changes cell transmission power or handover trigger parameters for the capacity-boost cell 38, and thereby gradually changes a coverage area of the capacity-boost cell 38.

Correspondingly, a second base station 36 is configured for controlling a capacity-boost cell 38 that is associated with a basic-coverage cell 34 that is controlled by a first base station 32. The second base station 36 comprises: a communication interface circuit 50 for exchanging control or status information with the first base station 32; and one or more processing circuits 52. In the context of the second base station 36, the processing circuits 52 are configured to: receive status or control information from the first base station 32 indicating that the capacity-boost cell 38 should be transitioned to or from a power-savings mode; and dynamically control the transition of the capacity-boost cell 38 to or from the power-savings mode so that a coverage area of the capacity-boost cell 38 gradually changes during said transition.

Notably, modifications and other embodiments of the disclosed invention(s) will come to mind to one skilled in the art having the benefit of the teachings presented in the foregoing descriptions and the associated drawings. For example, the present invention is not limited to use for LPN cells and can be applied in other cell types. For example, the cell coverage area control, and the dynamic linking of the rate or extent at which cell transmission power or handover trigger parameters are changed can be applied in basic-coverage cells. In a broad aspect of the present invention, the controlled increase or decrease in cell coverage area in one cell can be dynamically controlled as a function of conditions—e.g., loading, etc.—in an associated cell, e.g., based on status or control information exchanged between the cells' base stations. Such operations establish, in some sense, a control loop wherein cell coverage area in one cell is, for example, gradually decreased at a rate or at times/steps that depends on status or control information from another cell, e.g., where that other cell repeatedly sends such information.

Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of controlling cell coverage area in a second cell that operates as a capacity-boost cell for a first cell that operates as a basic-coverage cell, said method comprising:
   determining that the capacity-boost cell should be transitioned to or from a power-savings mode;
   initiating the transition by beginning a gradual change in cell coverage area of the capacity-boost cell by initiating a change in at least one of cell transmission power and cell handover trigger parameters for the capacity-boost cell; and
   dynamically controlling the change in cell coverage area as a function of status or control information sent repeatedly from the basic-coverage cell, so that a rate or extent of the change in the cell coverage area depends on the status or control information.

2. The method of claim 1, wherein a second base station controlling the capacity-boost cell receives the status or control information from a first base station controlling the basic-coverage cell, wherein said status or control information comprises a repeatedly transmitted mobility change request message that includes a handover trigger change value or a transmission power change value, and wherein the second base station adjusts the rate or extent at which it changes the cell handover trigger parameters or cell transmission power as a function of the repeatedly received handover trigger or transmission power change values.

3. The method of claim 1, wherein the transition is to the power-savings mode, and wherein a second base station controlling the capacity-boost cell repeatedly sends cell loading information for the capacity-boost cell to a first base station controlling the basic-coverage cell, and wherein the second base station determines that the capacity-boost cell should be transitioned to the power-savings mode in response to receiving an indication to do so from the first base station, and wherein dynamically controlling the change in the cell coverage area comprises controlling the rate or extent at which the cell transmission power in the capacity-boost cell is reduced dynamically, in response to cell loading information repeatedly sent from the first base station to the second base station, for the basic-coverage cell.

4. The method of claim 3, further comprising ceasing reductions in the cell transmission power in response to detecting, via said repeated cell loading information, that the load in the basic-coverage cell meets or exceeds a defined first loading threshold.

5. The method of claim 4, further comprising reversing the reduction in the cell transmission power by making a dynamically controlled increase in the cell transmission power in response to detecting that the load in the basic-coverage cell has continued rising or exceeded a defined second threshold that is higher than the defined first threshold.

6. The method of claim 1, wherein a second base station controlling the capacity-boost cell receives load information repeatedly from a first base station controlling the basic-coverage cell, and wherein dynamically controlling the change in cell coverage area as a function of status or control information comprises the second base station dynamically controlling the rate or extent at which it changes the cell handover trigger parameters or the cell transmission power as a function of the repeatedly received cell load information.

7. A method of controlling cell coverage area in a second cell that operates as a capacity-boost cell for a first cell that operates as a basic-coverage cell, said method comprising:
   determining whether to transition the capacity-boost cell to or from a power-savings mode based on a cell status of one or both said capacity-boost cell and said basic-coverage cell, wherein the cell coverage area of the capacity-boost cell is reduced when transitioning to the power-savings mode and increased when transitioning from the power-savings mode;
   exchanging status or control information repeatedly between a first base station that controls the basic-coverage cell and a second base station that controls the capacity-boost cell; and
   dynamically controlling a rate or extent of change in the cell coverage area for said transition as a function of the repeatedly exchanged status or control information.

8. The method of claim 7, wherein the first and second base stations are first and second eNBs, respectively, in an LTE communications network.

9. The method of claim 8, wherein, in the case that the capacity-boost cell is not in the power-savings mode and the second eNB sends a loading indication to the first eNB that indicates that the capacity-boost cell is lightly loaded, said determining whether to transition the capacity-boost cell to or from the power-savings mode comprises the first base station deciding to transition the capacity-boost cell to the power-savings mode and sending an indication of that determination to the second base station, and wherein said dynamically controlling the rate or extent of change in the cell coverage area for said transition comprises the second base station beginning a gradual reduction in the cell coverage are in response to the indication that the power-savings mode should be entered.

10. The method of claim 9, further comprising the second eNB repeatedly sending a RESOURCE STATUS UPDATE message to the first eNB.

11. The method of claim 8, wherein the first eNB repeatedly sends a MOBILITY CHANGE REQUEST message to the second eNB via X2 signaling, each said message including an indicated change for a handover trigger value or a cell transmission power value, and wherein said dynamically controlling the rate or extent of change in the cell coverage area for said transition comprises the second base station dynamically controlling the rate or extent of change in cell coverage area responsive to the repeatedly received indicated changes in the handover trigger value or the cell transmission power value.

12. The method of claim 11, wherein the MOBILITY CHANGE REQUEST message repeatedly sent by the first eNB further includes an energy saving indicator.

13. The method of claim 8, wherein the first eNB repeatedly sends a RESOURCE STATUS UPDATE message to the second eNB via X2 signaling, said message indicating a load of the basic-coverage cell, and wherein said dynamically controlling the rate or extent of change in the cell coverage area for said transition comprises the second base station dynamically controlling the rate or extent of change in the cell coverage area responsive to the repeatedly received indicated load of the basic-coverage cell.

14. The method of claim 13, wherein the RESOURCE STATUS UPDATE message further includes a PRACH headroom indicator.

15. The method of claim 8, wherein the second eNB repeatedly sends a MOBILITY CHANGE REQUEST message to the first eNB via X2 signaling, where that message includes an energy savings indicator indicating a desire by said second eNB to transition into the power-savings mode, and wherein said first eNB decides whether to accept or deny the MOBILITY CHANGE REQUEST based on evaluating one or more status conditions of the basic-coverage cell, and sending back a return message that is either a MOBILITY CHANGE REQUEST ACKNOWLEDGMENT message or a MOBILITY CHANGE FAILURE message, in dependence on said evaluating, and further wherein the method includes the second eNB determining whether or not to transition to the power-savings mode in dependence on the return message from the first eNB.

16. A system comprising:
a first base station that is configured to control a basic-coverage cell in a wireless communication network;
a second base station that is configured to control a capacity-boost cell that boosts the capacity of the basic-coverage cell; and
wherein each said base station includes a communication interface circuit for exchanging status and/or control information with the other base station, and further includes one or more processing circuits;
wherein, in said first base station, the one or more processing circuits are configured to monitor loading in one or both of the basic-coverage cell and the capacity-boost cell, initiate a transition in the capacity-boost cell to or from a power-savings mode, based on said monitoring, and to dynamically control a rate or extent of said transition by repeatedly sending control or status information that gradually changes cell transmission power or handover trigger parameters for the capacity-boost cell, thereby gradually changing a coverage area of the capacity-boost cell; and
wherein, in said second base station, the one or more processing circuits are configured to initiate said transition to or from the power-savings mode in response to the control or status information repeatedly sent from first base station, and further to dynamically control the rate or extent of changes in cell coverage area by dynamically controlling the rate or extent of changes in the cell transmission power or the handover trigger parameters according to the control or status information repeatedly sent by the first base station.

17. A first base station for controlling a basic-coverage cell that is associated with a capacity-boost cell that is controlled by a second base station, said first base station comprising:
a communication interface circuit for exchanging control or status information with the second base station; and
one or more processing circuits configured to:
monitor loading in one or both of the basic-coverage cell and the capacity-boost cell;
initiate a transition in the capacity-boost cell to or from a power-savings mode, based on said monitoring; and
dynamically control a rate or extent of said transition by repeatedly sending control or status information to the second base station that gradually changes cell transmission power or handover trigger parameters for the capacity-boost cell, and thereby gradually changes a coverage area of the capacity-boost cell.

18. The first base station of claim 17, wherein the control or status information sent repeatedly from the first base station to the second base station comprises a repeatedly transmitted mobility change request message, and wherein the one or more processing circuits are configured to dynamically update a handover trigger change value or a transmission power change value in said repeatedly transmitted mobility change request message to effect a gradual change in the cell coverage area of the capacity-boost cell, for said transition to or from the power-savings mode.

19. The first base station of claim 17, wherein the one or more processing circuits are configured to monitor the loading of the capacity-boost cell, based on receiving loading information from the second base station, and wherein in the case that the capacity-boost cell is not in the power-savings mode and the received loading information indicates that the capacity-boost cell is lightly loaded, the one or more processing circuits at the first base station are configured to initiate the transition of the capacity-boost cell to the power-savings mode by sending an indication of that transition to the second base station.

20. The first base station of claim 19, wherein the one or more processing circuits of the first base station are further configured to dynamically control the rate of that transition to the power-savings mode of the capacity boost cell, so that the coverage area of the capacity-boost cell changes gradually.

21. A second base station for controlling a capacity-boost cell that is associated with a basic-coverage cell that is controlled by a first base station, said second base station comprising:
a communication interface circuit for exchanging control or status information with the first base station; and
one or more processing circuits configured to:
receive status or control information from the first base station indicating that the capacity-boost cell should be transitioned to or from a power-savings mode; and
dynamically control the transition of the capacity-boost cell to or from the power-savings mode so that a coverage area of the capacity-boost cell gradually changes during said transition.

22. The second base station of claim 21, wherein the control or status information sent repeatedly from the first base station to the second base station comprises a repeatedly transmitted mobility change request message, and wherein the one or more processing circuits of the second base station are configured to dynamically change a transmission power of the capacity-boost cell or handover trigger parameters of the capacity-boost cell as a function of changed values received in the repeatedly transmitted mobile change request message.

23. The second base station of claim 21, wherein the one or more processing circuits are configured to send loading information for the capacity-boost cell to the first base station, to trigger transitioning of the capacity-boost cell to the power-savings mode when the capacity-boost cell is not in the power-savings mode and is lightly loaded.

24. The second base station of claim 21, wherein the status or control information repeatedly received from the first base station comprises loading information for the basic-coverage cell, and wherein the one or more processing circuits of the second base station are configured to initiate the transition to or from the power-savings mode based on the received loading information.

25. The second base station of claim 24, wherein the one or more processing circuits of the second base station are further configured to dynamically control the rate or extent of the transition according to the received loading information repeatedly received from the first base station.

* * * * *